(12) United States Patent
Moskovchenko

(10) Patent No.: US 12,538,029 B2
(45) Date of Patent: Jan. 27, 2026

(54) HYBRID ZOOM SYSTEMS AND METHODS FOR IMPROVED ELECTRONIC IMAGE STABILIZATION OF UNMANNED AERIAL VEHICLE VIDEO STREAMS

(71) Applicant: Skydio, Inc., San Mateo, CA (US)

(72) Inventor: Stepan Moskovchenko, Belmont, CA (US)

(73) Assignee: Skydio, Inc., San Mateo, CA (US)

( * ) Notice: Subject to any disclaimer, the term of this patent is extended or adjusted under 35 U.S.C. 154(b) by 127 days.

(21) Appl. No.: 18/523,003

(22) Filed: Nov. 29, 2023

(65) Prior Publication Data

US 2024/0179413 A1    May 30, 2024

Related U.S. Application Data

(60) Provisional application No. 63/385,292, filed on Nov. 29, 2022.

(51) Int. Cl.
*H04N 23/69* (2023.01)
*G06T 3/40* (2006.01)
*G06V 20/17* (2022.01)
*H04N 23/68* (2023.01)

(52) U.S. Cl.
CPC .............. *H04N 23/69* (2023.01); *G06T 3/40* (2013.01); *G06V 20/17* (2022.01); *H04N 23/683* (2023.01)

(58) Field of Classification Search
CPC .................................................. H04N 23/683
See application file for complete search history.

(56) References Cited

U.S. PATENT DOCUMENTS

| | | | |
|---|---|---|---|
| 10,321,138 B2* | 6/2019 | Ali | H04N 19/166 |
| 10,735,653 B1* | 8/2020 | Huang | H04N 23/661 |
| 11,190,689 B1* | 11/2021 | Wang | H04N 23/683 |
| 11,336,832 B1* | 5/2022 | Stimm | G06T 3/60 |
| 2010/0136507 A1* | 6/2010 | Miyata | G09B 9/04 434/29 |
| 2012/0019660 A1* | 1/2012 | Golan | H04N 23/682 348/E7.085 |
| 2015/0207964 A1* | 7/2015 | Bye | F16M 11/2014 348/374 |
| 2018/0259339 A1* | 9/2018 | Johnson | G05D 1/0692 |
| 2024/0098367 A1* | 3/2024 | Patsekin | G06T 7/97 |
| 2024/0179410 A1* | 5/2024 | Moskovchenko | H04N 23/6812 |

* cited by examiner

*Primary Examiner* — Cynthia Segura

(57) ABSTRACT

Systems and methods for operating an unmanned aerial vehicle (UAV). A method includes capturing a raw video stream input using one or more camera sensors of the UAV. The method includes determining a zoom level for the raw video stream input. For the zoom level being determined to be greater than 3×, the method includes: first zooming the raw video stream input to a first field of view (FOV) at 3× to generate a 3× zoomed video stream; second zooming the 3× zoomed video stream to a second FOV at a second zoom level to generate a fully zoomed video stream at greater than 3×; and applying electronic image stabilization (EIS) to the fully zoomed video stream to generate a zoomed and stabilized video stream. Embodiments of the present technology provide a hybrid zoom approach with improved EIS performance to enhance the UAV user experience.

21 Claims, 10 Drawing Sheets

HYBRID ZOOM SYSTEMS AND METHODS FOR IMPROVED ELECTRONIC IMAGE STABILIZATION OF UNMANNED AERIAL VEHICLE VIDEO STREAMS

CROSS-REFERENCE TO RELATED APPLICATIONS

This application claims priority to and benefit of U.S. Provisional Patent Application Ser. No. 63/385,292, filed Nov. 29, 2022, and entitled "HYBRID ZOOM SYSTEMS AND METHODS FOR IMPROVED ELECTRONIC IMAGE STABILIZATION OF UNMANNED AERIAL VEHICLE VIDEO STREAMS," the contents of which are expressly incorporated by reference in its entirety for all purposes herein.

TECHNICAL FIELD

Various implementations of the present technology relate to unmanned aerial vehicles (UAVs) and, in particular, to hybrid zoom techniques for enhancing the effectiveness of electronic image stabilization.

BACKGROUND

Unmanned aerial vehicles (UAVs, a.k.a. drones) find uses in a variety of applications by a variety of private, commercial and government users. At least some known UAV systems and associated operational techniques transmit image or video data wirelessly to ground stations during flight. Electronic image stabilization (EIS) may be utilized in an effort to stabilize streaming or stored video in response to both commanded (sudden joystick movements) and unintentional (e.g., wind sheer) motion of the UAV. When image or video frames are zoomed prior to application of EIS, as at a camera front end of the UAV, the EIS may be less effective, and a UAV user's experience may be negatively impacted.

Accordingly, a need exists for technology that overcomes the problems demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

The present technology provides systems, methods, and software for operating an unmanned aerial vehicle (UAV). A first aspect of the disclosure provides a method for operating a UAV. The method includes capturing a raw video stream input using one or more camera sensors of the UAV. The method includes determining a zoom level for the raw video stream input. For the zoom level being determined to be less than or equal ($\leq$) to 3×, the method includes the steps of: zooming the raw video stream input to a field of view (FOV) at a first zoom level of $\leq$ to 3× to generate a zoomed video stream; and applying electronic image stabilization (EIS) to the zoomed video stream to generate a zoomed and stabilized video stream. Alternatively, for the zoom level being determined to be greater than ($>$) 3×, the method includes the steps of: first zooming the raw video stream input to a first FOV at 3× to generate a 3× zoomed video stream; second zooming the 3× zoomed video stream to a second FOV at a second zoom level to generate a fully zoomed video stream at >3×; and applying EIS to the fully zoomed video stream to generate a zoomed and stabilized video stream.

A second aspect of the disclosure provides a UAV system. The system includes one or more camera sensors for capturing a raw video stream input. The system includes at least one computing device disposed onboard the UAV and operably coupled to the one or more camera sensors. The at least one computing device is configured to determine a zoom level for the raw video stream input. For the zoom level being determined to be $\leq$3×, the at least one computing device is further configured to: zoom the raw video stream input to an FOV at a first zoom level of less than or equal to 3× to generate a zoomed video stream; and apply EIS to the zoomed video stream to generate a zoomed and stabilized video stream. Alternatively, for the zoom level being determined to be >3×, the at least one computing device is further configured to: first zoom the raw video stream input to a first FOV at 3× to generate a 3× zoomed video stream; second zoom the 3× zoomed video stream to a second FOV at a second zoom level to generate a fully zoomed video stream at >3×; and apply EIS to the fully zoomed video stream to generate a zoomed and stabilized video stream.

A third aspect of the disclosure provides one or more non-transitory computer readable media. The one or more non-transitory computer readable media has stored thereon program instructions which, when executed by a computing device, cause a UAV to determine a zoom level for a raw video stream input captured by one or more camera sensors of the UAV. For the zoom level being determined to be $\leq$3×, the program instructions, when executed by the computing device, further cause the UAV to: zoom the raw video stream to a FOV at a first zoom level of $\leq$3× to generate a zoomed video stream; and apply EIS to the zoomed video stream to generate a zoomed and stabilized video stream. Alternatively, for the zoom level being determined to be >3×, the program instructions, when executed by the computing device, further cause the UAV to: first zoom the raw video stream to a first FOV at 3× to generate a 3× zoomed video stream; second zoom the 3× zoomed video stream to a second FOV at a second zoom level to generate a fully zoomed video stream at >3×; and apply EIS to the fully zoomed video stream to generate a zoomed and stabilized video stream.

Embodiments of the present technology provide for a hybrid zoom approach whereby a maximum camera front end zoom is constrained, and additional zooming is implemented in conjunction with the EIS, thereby enabling a greater pixel area for movement of a viewport and thus enhancing the UAV user's experience as compared to conventional systems and methods. Examples of embodiments of the present technology are provided and described in the Detailed Description with reference to the Drawings.

BRIEF DESCRIPTION OF THE DRAWINGS

One or more embodiments of the present invention are illustrated by way of example and not limitation in the figures of the accompanying drawings, wherein alphanumeric labels correspond to their mention in the Detailed Description.

Figure 1:
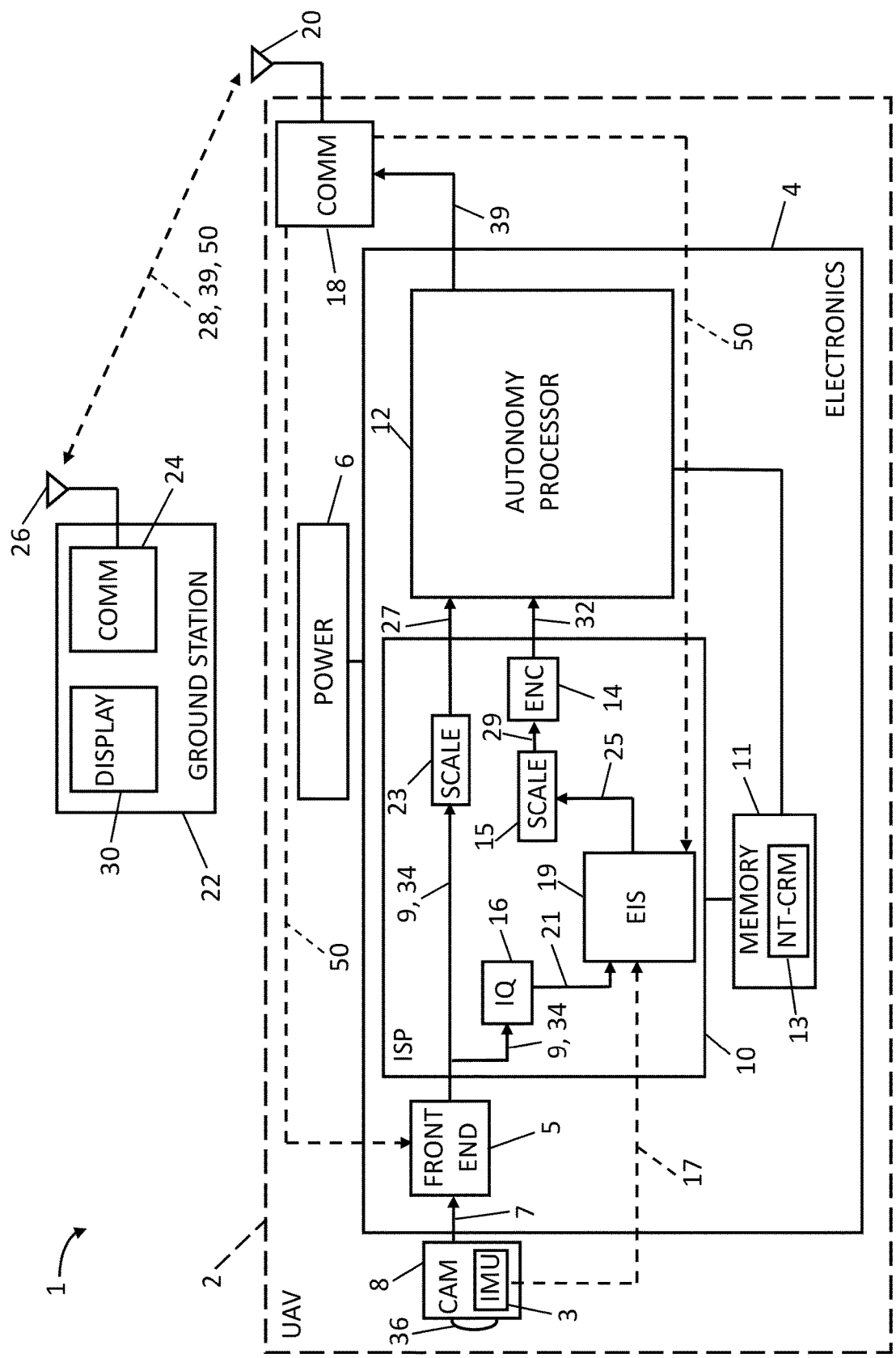
FIG. 1 depicts a block diagram of an unmanned aerial vehicle (UAV) system in accordance with some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, computing processes and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

This present disclosure describes computing, communication and data storage systems, methods, and software for providing a hybrid zoom approach whereby a maximum camera front end zoom is constrained and any additional required (e.g., as commanded by a UAV user) zooming is implemented in conjunction with electronic image stabilization (EIS), thereby enabling a greater pixel area for movement of a viewport and thus enhancing the UAV user's experience as compared to conventional systems and methods. The embodiments of the present disclosure improve upon, and provide unique technical benefits to, technology fields including UAV-related systems and methods of operation involving image processing of video streams, and transmission thereof, from onboard camera sensors. The various technical benefits and effects of the disclosed embodiments are implemented specifically and exclusively in specialized computing, communication and data storage (e.g., memory) devices and systems. Although some such devices and their interconnections may be known to persons of ordinary skill in the art, their configuration and use as described herein provide an advantageous contribution to the technical problem of how to provide a greater pixel area for application of EIS to image or video frames zoomed prior to the EIS routines being performed, according to the disclosed embodiments.

As will become apparent to persons skilled in the art, the disclosed embodiments are not merely process steps capable of being performed using generic computing devices, but which could be performed mentally or otherwise by a human being, including with the aid of pen and paper. Rather, the unique algorithms described herein are required to be encoded in software instructions to direct (e.g., "cause") the physical actions of the various computing, communications and data storage devices in a manner believed to be as yet unknown in the pertinent technological field. These physical effects and actions include, without limitation, transmission of encoded data as signals over wired or wireless communication channels, both within one particular computing device and over great distances over spans of the Earth or outer space. The described algorithms direct data to be stored according to received data inputs originating from camera sensors of the UAV and from a ground station utilized for piloting the UAV, among other purposes. All of these actions, and numerous others that are described herein, are performed by physical computing and communication devices, as directed by the disclosed algorithms.

Furthermore, the physical actions which are specifically caused to occur using computing devices having processors taking as commands encoded software or firmware instructions stored in non-transient computer-readable storage media are performed and coordinated thereby in substantially real-time. Real-time is defined as a very nearly instantaneous result of an input, stimulus, or computation performed by a computing device as described herein, where the timing of a subsequent action is limited only by the physical makeup or design of the computing device and communications network. For example, a duration between a time upon which a result of a first computation is generated by a first networked computing device a time between that result becomes available for a subsequent computation by a second networked computing device may be limited only by a transmission time required by the physical medium of the wired, optical or wireless network connecting the first and second computing devices.

A person having ordinary skill in the art will recognize and appreciate that not only are the disclosed algorithms incapable of being performed mentally by a human being, they are certainly not capable of being performed mentally with the aid of pen and paper in real time, or otherwise by a human being within a time sufficient to provide both the disclosed technical advantages and effects, and the improved user experience, in the practical application to the pertinent technological field.

More particularly, the disclosed embodiments enable a hybrid zoom approach whereby a maximum camera front end zoom is constrained and any additional required (e.g., as commanded by a UAV user) zooming is implemented in conjunction with electronic image stabilization (EIS), thereby enabling a greater pixel area for movement of a viewport and thus enhancing the UAV user's experience as compared to conventional systems and methods. As one example, the disclosed systems, methods and software for operating a UAV improve upon conventional techniques for EIS of zoomed video frames by providing a greater pixel area with which EIS routines may work with, thus enhancing the UAV user's experience.

FIG. 1 depicts a block diagram of a UAV system 1 in accordance with some embodiments. UAV system 1 may include a UAV 2 with on-board electronics 4. UAV 2 may also include an electric power source 6, such as a rechargeable battery pack, operably coupled to electronics 4 to supply power thereto during operation of UAV 2. UAV 2 may include one or more camera sensors 8, such as red-green-blue (RGB) type cameras and/or infrared (IR) cameras, for obtaining still image and/or video streams during operation of UAV 2. Electronics 4 may include one or more integrated circuits having various functionality for implementing the present technology as described herein. In some embodiments, electronics 4 is essentially a single integrated circuit, while in other embodiments, electronics 4 may include a plurality of different but interconnected integrated circuits, where each integrated circuit may provide a separate, or subset of, functionality to electronics 4 for implementing the present technology. As used herein, module or modules may refer to a functional block or set of interconnected blocks of electronics 4, where such module(s) may include digital and/or analog electronic components of the wider electronics 4 of UAV 2, and which may further include computing and memory data storage devices that may be dedicated for use by specific modules, or which may be shared amongst two or more modules of electronics 4. Such structure and function of module(s) of electronics 4 according to the present technology is expected to become fully apparent to persons having ordinary skill in the art upon further study of the disclosure.

Electronics 4 may include an image signal processor (ISP) module 10 operably coupled in communication with camera sensor(s) 8. Electronics 4 may also include an autonomy processor (AP) module 12 operably coupled in communication with ISP module 10. Electronics 4 may further include at least one memory data storage device ("memory" for short) 11 operably coupled in communication with ISP module 10 and/or AP module 12. Memory 11 may be capable of storing image data including such data generated by camera sensor(s) 8. Memory 11 may be capable of permanently storing such data in a format that is readable by devices and systems operable by a user of UAV 2 that are external to UAV 2. For example, and without limitation, memory 11 may at least in part be embodied in a removable disk, such as a SECURE DIGITAL (SD) card. As another example, a user of UAV 2 may read image or video data from memory 11 using a wired (e.g., serial) connection such as universal serial bus (USB). Memory 11 may store configuration data for use during operation of UAV 2 according to the present technology. Memory 11 may include one or more non-transient computer readable media (NT-CRM) 13. NT-CRM 13 may have stored thereon program instructions as, for instance, software and/or firmware code in assembled and compiled form for use by computing device(s) such as one or more processors of electronics 4 to implement, execute, or otherwise facilitate various useful operations and algorithms during operation of UAV 2 according to the present technology.

UAV 2 includes various mechanical and other electronic components like motors and associated controllers for flight. These are not shown in FIG. 1 as they exceed the scope and spirit of this disclosure. Persons having ordinary skill in the art are expected to be able to readily envision such components and their usage in conjunction with the present technology, which may find advantageous application in a wide array of types of UAVs and similar vehicles, even ground or water based vehicles, beyond those commercially available and in development by the Applicant.

UAV 2 may include a communications interface 18 operably coupled in communication with AP module 12. In some embodiments, communications interface 18 may include one or more radio frequency (RF) antenna(s) 20. Communication interface 18 may be embodied in an RF transceiver capable of transmitting and receiving signals encoding various types of data useful to system 1 during operation of UAV 2. In some embodiments, communication interface 18 utilizes WiFi communication protocols for its transceiver functionality. System 1 may also include a ground station 22. Ground station 22 may include a communication interface 24 for communicating, e.g., via RF antenna(s) 26 using WiFi, with UAV 2. In some embodiments, ground station 22 may also include an electronic display device 30 providing user(s) of system 1 the ability to see video from captured camera sensor(s) 8 in real time by way of an RF communications link 28 established between communication interface 24 and communication interface 18.

In one embodiment, electronics 4 may include a camera front end module 5 operably communication in communication to and between camera sensor(s) 8 and ISP module 10. In other embodiments, front end module 5 may be situated outside of electronics 4 as, for example and without limitation, an integral part of camera sensor(s) 8. Each of the one or more camera sensors 8 may include a lens 36. In some embodiments, lens 36 may be a wide angle lens. Lens 36 may have a shape and/or material of construction, among other physical and/or optical properties, to focus visible or other (e.g., IR) light onto sensor(s) 8 to produce a digital representation of an image by way of transduction of the energy of the light into a digital representation in data that may be stored and transmitted. As described below, some embodiments of the present technology may account for such aforementioned physical and/or optical properties of the lens 36 in applying EIS and related image processing techniques. Camera sensor(s) 8 may include or be coupled to at least one motion sensor to detect properties of linear and/or angular motion (e.g., direction and magnitude of acceleration) of camera sensor(s) 8. In an example, such motion sensor(s) may include or be embodied in at least one inertial measurement unit (IMU) 3.

Front end module 5 may receive a raw video stream input 7 from camera sensor(s) 8 as image data. Front end module 5 may include digital and/or analog electronic components capable of converting the image data captured by camera sensor(s) 8 into luminance-bandwidth-chrominance (YUV) format. In some embodiments, front end module 5 may before basic image processing such as enhancement and/or color correction on raw video stream input 7. Front end module 5 may, instead of or in addition to the aforementioned basic image processing operations, crop and scale frames of the raw video stream input 7.

Figure 2:
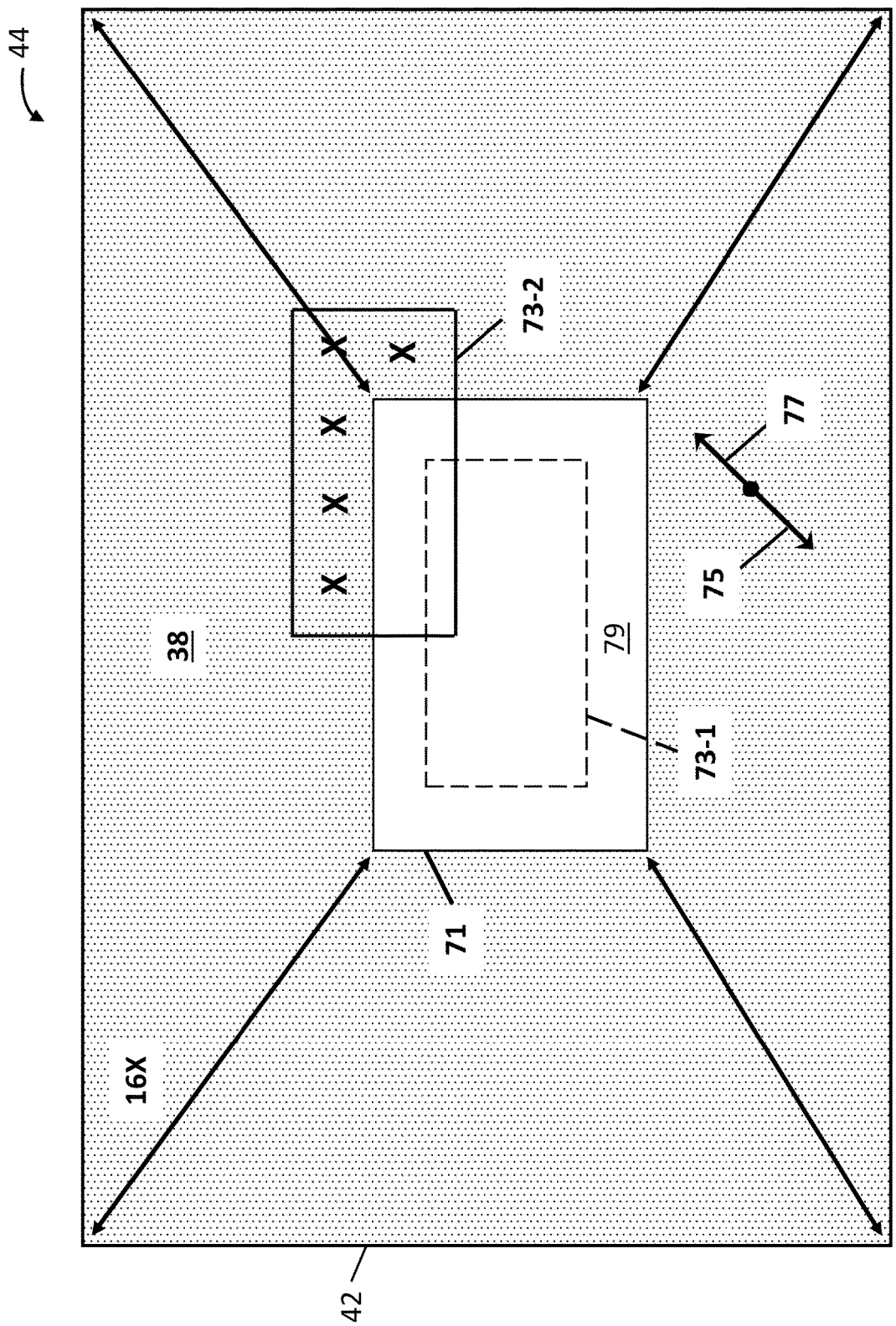
FIG. 2 depicts a block diagram of a zoom and electronic image stabilization process according to a known implementation.

FIG. 2 depicts a block diagram of a zoom and electronic image stabilization process 44 according to a known implementation. A front end module utilized in a known zoom and EIS process 44 may perform zooming and scaling of raw video input stream 7 in a range of 1× to 16×. Camera sensor(s) 8 in the known process 44 may capture raw video stream input 7 at 4056×3040=12.33 megapixels, for example. In process 44, front end module may scale frames of raw video input stream 7 based on the zoom level desired by the UAV user, where the scaling is a downscaling in proportion to the zoom level. Such downscaling in proportion to the zoom level commanded by UAV user effectively crops window 42 to window 71, for example. FIG. 2 shows the case for a 16× zoom level, with window 42 representing a frame of raw video stream input 7. Front end module used in process 44 downscales (e.g., crops) window 42 to window 71. EIS is then applied to window 71, with a margin 79 being applied to window 71. The EIS margin 79 may be 15%, thereby reducing (e.g., cropping) the size (e.g., area) of window 71 by 15%, thereby resulting in a stabilization viewport 73-1, as shown in FIG. 2.

In process 44, EIS may use IMU 3 to compute a vector 75 representing an acceleration of camera sensor(s) 8 and compute an opposing vector 77 to counteract effects of vector 75. EIS may move window 73-1 from a first position to a second position represented by window 73-2 in FIG. 2. Such movement may be made in process 44 according to opposing vector 77, where the direction of the movement may be generally opposite that of vector 77 in an effort to stabilize (e.g., still) the image frame and thus also the video stream displayed to UAV user at, e.g., ground station 22. However, EIS in process 44 may, depending on the extent (e.g., magnitude) of vector 75, and thus also opposing vector 77, attempt to move window 73-1 to the second positioned window 73-2 into the area of window 42, where pixels 38 may be discarded or otherwise not, at least immediately, available for use by EIS image processing. Accordingly, in cases such as depicted in FIG. 2, EIS may be less effective in the known process 42 and a UAV user's experience may be negatively impacted. Example beneficial and advantageous technical effects in this regard of embodiments of the present technology are described below, including with respect to FIGS. 4A and 4B.

Back to FIG. 1 and the present technology, in an example, camera sensor(s) 8 may capture raw video stream input 7 at 4056×3040=12.33 megapixels, and front end module 5 may scale that input 7 for an initial crop. Front end module 5 may be operably coupled in communication with communications interface 18. In an example, a UAV 2 user operating ground station 22 may input a desired zoom command and communications interface 24 of ground station 22 may responsively transmit a zoom control signal 50 encoding data representative of the zoom level desired by the UAV 2 user. Zoom control signal 50 may be received by communications interface 18 and relayed to front end module 5. To address the undesired issues of process 44 as described above with reference to FIG. 2, for example and without limitation, zooming and corresponding scaling/cropping operations by front end module 5 may be limited (e.g., clamped) to a maximum of 3× in some embodiments. So, for example, system 1 may be capable of zooming raw video stream input 7 in the range of 1× to 16×, but, as described in greater detail below, front end module 5 will not zoom beyond 3× despite a user-commanded zoom as provided by zoom control signal 50 being greater than 3×. Accordingly, front end module 5 may output a zoomed video stream 9 for use by ISP module 10 with raw video stream input 7 zoomed up to 3× (or not zoomed at all in the case of a 1× commanded zoom). Alternatively, front end module 5 may output a 3× zoomed video stream 34 for use by ISP module 10 with raw video stream input 7 zoomed from 3× up to a maximum system 1 zoom (e.g., 16×).

ISP module 10 may include an EIS module 19 operably coupled in communication with front end module 5 to receive YUV format zoomed video stream 9 or YUV format 3× zoomed video stream 34, depending on the user-commanded zoom level. In some embodiments, system 1 includes an image quality (IQ) module 16 operably coupled in communication to and between front end module 5 and EIS module 19. IQ module 16 may include analog and/or digital electronic components to perform image processing to enhance image frames of video streams 9 and/or 34 prior to additional processing by EIS module 19. In an example, IQ module 16 is included in electronics 4. In another example, IQ module 16 may instead, or additionally, be included in front end module 5. In embodiments including IQ module 16, EIS module 19 may receive an enhanced video stream 21, either instead of or in addition to receiving as its input video streams 9 and/or 34 as YUV formatted data.

System 1 may include a scaler 23 operably coupled in communication to and between front end module 5 and AP module 12 to receive as its input YUV format data video streams 9 and/or 34. Scaler 23 may include analog and/or digital electronics to scale video stream(s) 9 and/or 23 at 4K to 720p YUV formatted data, for example and without limitation, as an unencoded scaled video stream 27 for use in a first set of image processing operations by AP module 12. In one example, ISP module 10 includes scaler 23. In another example, scaler 23 may instead, or additionally, be included in front end module 5 or elsewhere in electronics 4.

EIS module 19 may output a zoomed and stabilized video stream 25 in YUV format. System 1 may include an encoder 14, and a scaler 15 operably coupled in communication to and between EIS module 19 and encoder 14. Scaler 15 may receive as its input the zoomed and stabilized video stream 25 from EIS module 19. Scaler 15 may include analog and/digital electronics to scale video stream 25 to 720p (or 360p) YUV formatted data, for example and without limitation, as an unencoded scaled stabilized video stream 29. Encoder 14 may include analog and/digital electronics to encode 720p (or 360p) YUV video stream 19 at 15 fps into H.264 video format at 30 fps. As such, encoder 14 may output an H.264 encoded scaled stabilized video stream 32 for use in a second set of image processing operations by AP module 12. In some embodiments, processes of the aforementioned first set of operations may partially or entirely overlap with processes of the second set of operations executed, performed, or otherwise implemented, at least in part, by AP module 12. In one example, ISP module 10 includes scaler 15 and/or encoder 14. In another example, encoder 14 and/or scaler 15 may instead, or additionally, be included in EIS module 19, or elsewhere in electronics 4.

EIS module 19 may be operably coupled in communication with communications interface 18 to receive and process a zoom control signal 50 in like manner as front end module 5 does. Zoom control signal 50 may be received by communications interface 18 and relayed to EIS module 19. With the zoom level clamped to ≤3× at the front end module 5, additional zooming (e.g., 3× up to a maximum of 16×, and corresponding cropping, if applicable) may be executed, performed, or otherwise implemented according to the present technology by EIS module 19. As described in greater detail below, for a user-commanded zoom level of 3× or less, EIS module 19 may stabilize the video for the user's benefit using zoomed video stream 9, or data derived therefrom. Alternatively, for a user-commanded zoom level greater than 3×, EIS module 19 may stabilize the video for the user's benefit using 3× zoomed video stream 34, or data derived therefrom. For example, for a user-commanded zoom of 6×, front end module 5 zooms first to 3× (it's clamped maximum zoom) and then ESI module 19 zooms a further 2×, thereby providing the zoomed and stabilized video stream 25. Likewise, for a user-commanded zoom of 12×, front end module 5 zooms first to 3× (it's clamped maximum zoom) and then ESI module 19 zooms a further 4× to provide the zoomed and stabilized video stream 25 at the full 12× zoom. In the end, the user will experience greater EIS benefit with the present technology over the full range of zooming capability of UAV obtained video streams.

Figure 3:
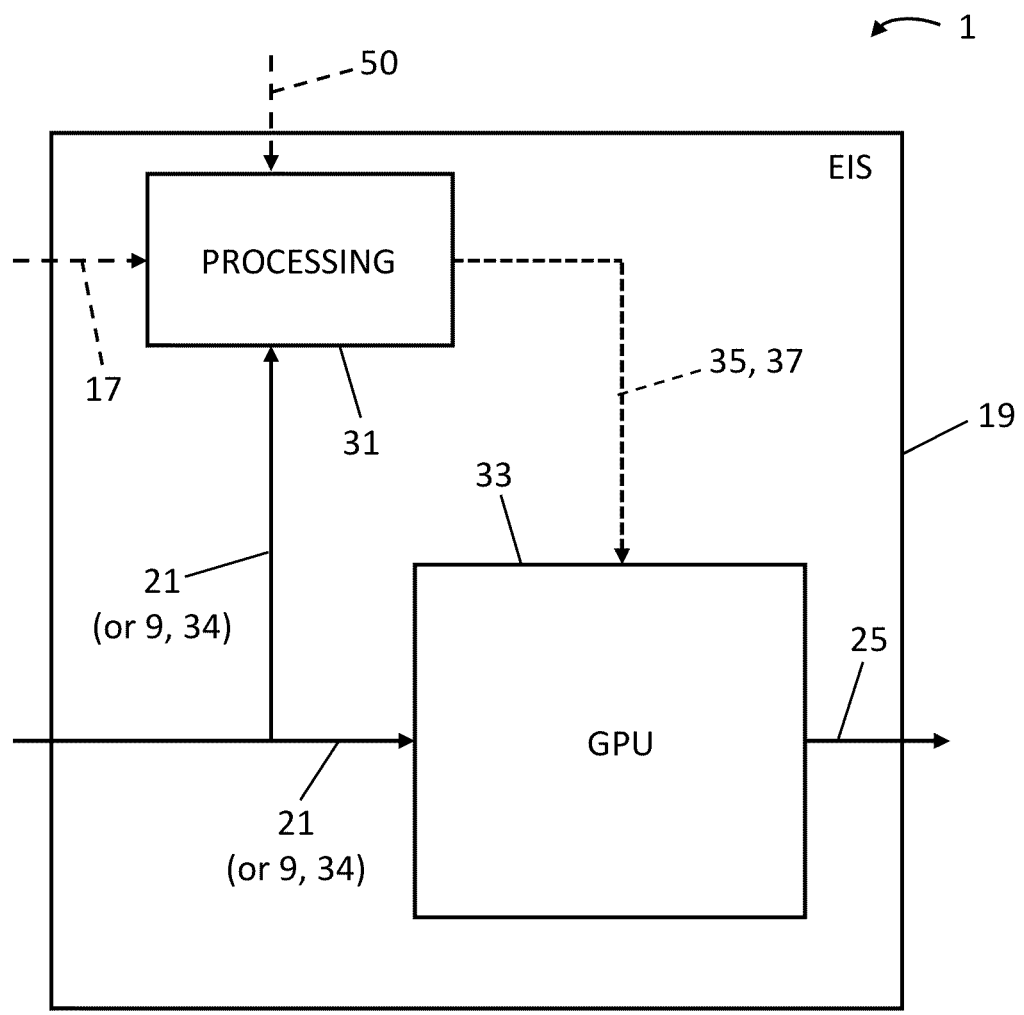
FIG. 3 depicts a block diagram of aspects of the UAV system of FIG. 1 in accordance with some embodiments.

FIG. 3 depicts a block diagram of aspects of the UAV 2 system 1 of FIG. 1 in accordance with some embodiments. ISP module 10, and more specifically EIS module 19 in an example, may include a processing module 31 operably coupled in communication with IMU 3 to receive a signal 17 therefrom encoding data representative of linear and or angular acceleration of camera sensor(s) 8, as detected by IMU 3. In some embodiments, EIS module 19 is a software and/or firmware implementation that may utilize a system 1—wide, or EIS specific processor having one or more central processing units (CPUs) that may execute EIS and related image processing operations that are at least in part encoded as program instructions stored in NT-CRM 13. In those embodiments, processing module 31 is likewise embodied in software and/or firmware.

Still referring to FIG. 3, ISP module 10, and more specifically EIS module 19 in some examples EIS module 19, may include a graphics processing unit (GPU) 33 operably coupled in communication with front end module 5 to receive therefrom zoomed video stream 9 and/or 3× zoomed video stream 34. In embodiments where IQ module 16 is present, GPU 33 may instead be operably coupled in communication with IQ module 16 to receive therefrom enhanced video stream 21. GPU 33 may be embodied in hardware as separate computing device apart from any other computing device, processor, or CPU of system 1. GPU 33 may likewise include or be associated with its own dedicated memory, including NT-CRM as needed for executing GPU-specific software and/or firmware operations according to the present technology. Processing module 31 may also be operably coupled in communication with front end module 5 (or IQ module 16) to receive video stream(s) 9 and/or 34 (or video stream 21) therefrom. Processing module 31 may be further operably coupled in communication with communications interface 18 to receive zoom control signal 50 therefrom.

In some embodiments, ISP module 19 is or includes a system-on-a-chip (SOC). Processing module 31 and GPU 31 may work in cooperation to ultimately and timely provide the zoomed and stabilized video stream 25 output by EIS module 19 for further processing according to the present technology. In some embodiments, processing module 31 uses metadata include in, or associated with, video stream(s) 9 and/or 34 (or video stream 34), along with data encoded by signal 17, to compute a vector representative of the acceleration of the camera sensor(s) 8. Such metadata may include timestamp, exposure time, and other information useful for image processing operations executed, performed, or otherwise implemented by processing module 31. Such vectors (e.g., vector 47, as described below with reference to FIGS. 5A and 5B) may provide a real time, or very nearly instantaneous, quantitative direction and magnitude description of how camera sensor(s) 8 are moving (e.g., shaking) in a manner that may causing shaking or other unsteadiness in a video stream being view by UAV 2 user at ground station 22.

Based on an information content of zoom control signal 50, processing module 31 may also apply an additional user-commanded zoom factor to video stream(s) 9 and/or 34 (or video stream 34) above 3× in cases where the zoom desired by the UAV 2 user is >3×. For instance, with a user-commanded zoom level of 9×, front end module 5 zooms to 3×, and then processing module 31 applies the addition 3× zoom for the 9× total zoom. In such cases, processing module 31 may pass a fully zoomed video stream 37 to GPU 33 for further processing according to the present technology. Alternatively, video stream(s) 9 and/or 34 (or video stream 34) may be simply passed to CPU 33 in cases where the user-commanded zoom level is ≤3×. In any event, the aforementioned operations of processing module 31 may result in mesh data 35 being output for use by GPU 33. Mesh data 35 may include an array of values that preliminarily describe a shape of a stabilization viewport (e.g., 49 or 57, as described below with reference to FIGS. 5A and 5B) for EIS.

Either or both of processing module 31 and GPU 33 may compute an opposing vector (e.g., 55 or 63, as described below with reference to FIGS. 5A and 5B) to counteract the effects of the aforementioned vector in terms of both direction and magnitude to stabilize a shaky image. A signal encoding data representative of a quantitative description of the opposing vector may be passed from processing module 31 to GPU 33 in some embodiments. Processing module 31 and/or GPU 33 may produce the stabilization viewport initially based upon mesh data, and then move the viewport in a direction, and to an extent, according to the aforementioned opposing vector. The stabilization viewport may have a more complex shape than simply a rectangle. In some embodiments, processing module 31 and/or GPU 33 may shape the stabilization viewport for EIS more complexly, as be accounting for lens 36 physical and/or optical properties, and infringement and/or roll and shudder behavior. EIS module 19 and its component parts and software/firmware may read such properties and parameters describing infringement behavior from memory 11, for example.

In some embodiments, operations performed by processing module 31 and GPU 33 are not simply a crop and scale. Rather, the mesh data 35 may be used to create a texture map in individual frames, and across a plurality of frames, of the video stream data of interest. For example, and without limitation, GPU 33 may stretch and deform the stabilization viewport according to the mesh data 35 and the aforementioned vector and opposing vector. GPU 33 is particularly suited to this sort of image processing because its specialization and speed ensures that such operations take place quickly enough and with low enough latency to provide continual high quality video streams to UAV 2 user that are stabilized in the desired manner. The hybrid zoom and subsequent EIS processes according to the present technology may be described as complex cropping, with mesh data 35 being used, at least in part, to describe dynamic shaping of the stabilized viewport over time. As such, the processes may be performed iteratively and, in some cases, in parallel. In some embodiments, EIS module 19 and its component parts processing module 31 and/or GPU 33 utilize direct memory access (DMA) components and techniques (not shown in FIGS. 1 and 3) to ensure high performance operations according to the present technology.

Functionality provided by analog and/or digital electronic components of AP module 12 may include navigation of UAV 2, annotation of image frames and video streams, tracking of objects between video frames, and other advantageous operations of UAV 2. In some embodiment, the aforementioned first set of operations of AP module 12 may require that input data in the form of video stream 27 be in YUV format and not be zoomed to greater than 3×. Accordingly, system 1 may split the output video stream(s) 9 and/or 34 from front end 5 into scalers 15 and 23, as described above, where video stream 27 will provide input data to AP module 12 meeting the aforementioned requirement. Computing devices and associated software and/or firmware of or associated with AP module 12 may be involved in performing data processing to facilitate such functions and operations perform such functions, and other functions which are beyond the scope and spirit of the present disclosure. AP module 12 may further include digital and/or analog electronic circuitry to generate and transmit, e.g., using communications interface 18 via communications link 28, signal(s) encoding data representative of a final processed (e.g., EIS stabilized) video stream 39 for use by ground station 22.

Ground station 22 may be embodied in one of several types of machines. One example ground station 22 is a smartphone running a specialized application for piloting UAV2 and viewing video therefrom. In the smartphone, or likewise laptop, case, the application may be capable of drawing annotations as part of rendering video on display 30. In another example, ground station 22 may be embodied in a machine that is not fully, or even partially, capable of drawing annotations on video. Whereas a smartphone application may be designed to be used effectively with a specific UAV 2 as its ground station 22 including for annotations of video, a ground station 22 not having that capability may still be utilized to display video from UAV 2 to users. Enabling such other ground stations 22 to be used to pilot UAV 2 and view video therefrom is advantageous because it may expand the reach of useful applications that UAV 2 may be used for (e.g., police, military, fire, search & rescue, etc.) where smartphones with tailored applications may be unavailable.

Figure 4A:
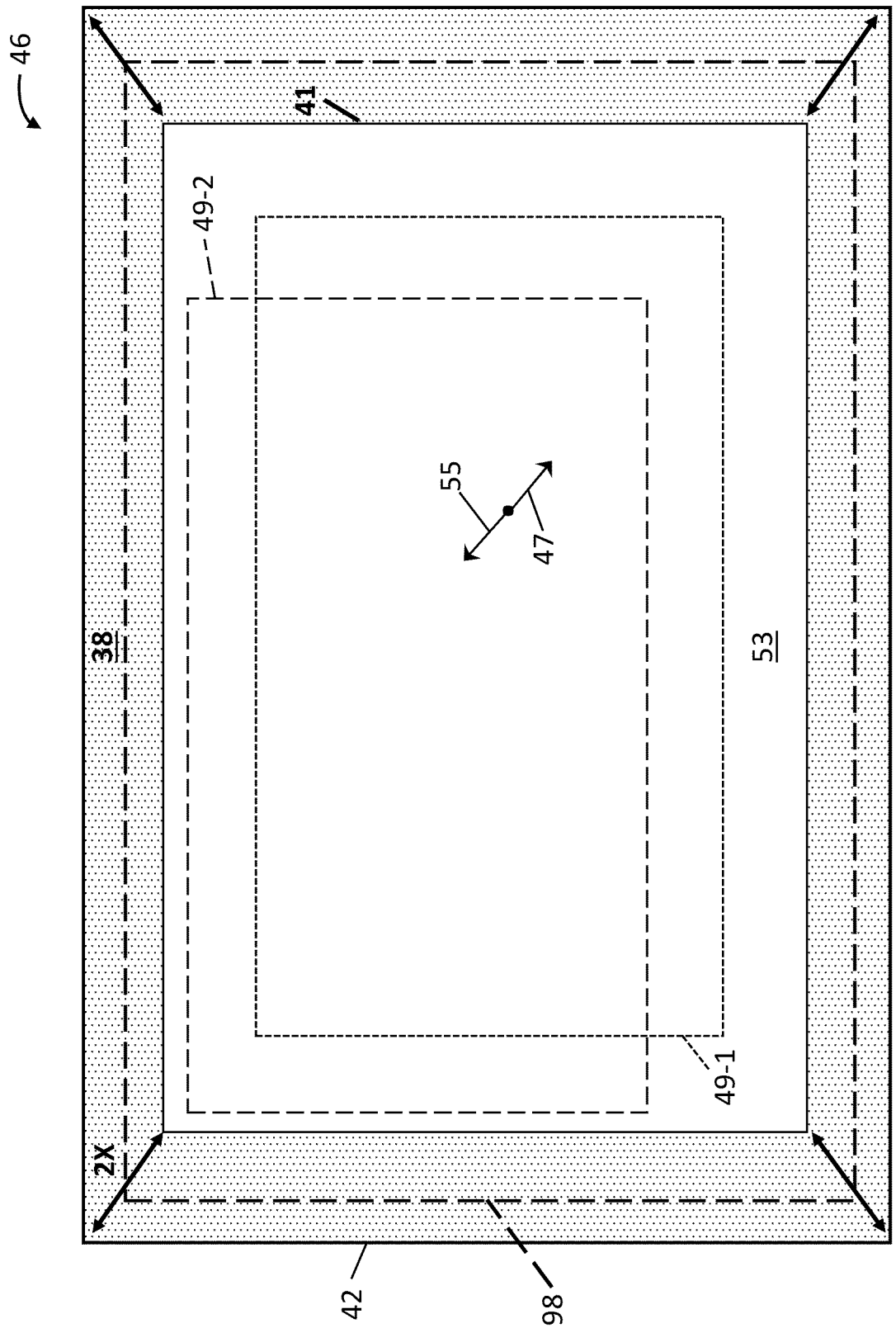
FIGS. 4A and 4B depict block diagrams of an electronic image stabilization process in accordance with some embodiments.
Figure 4B:
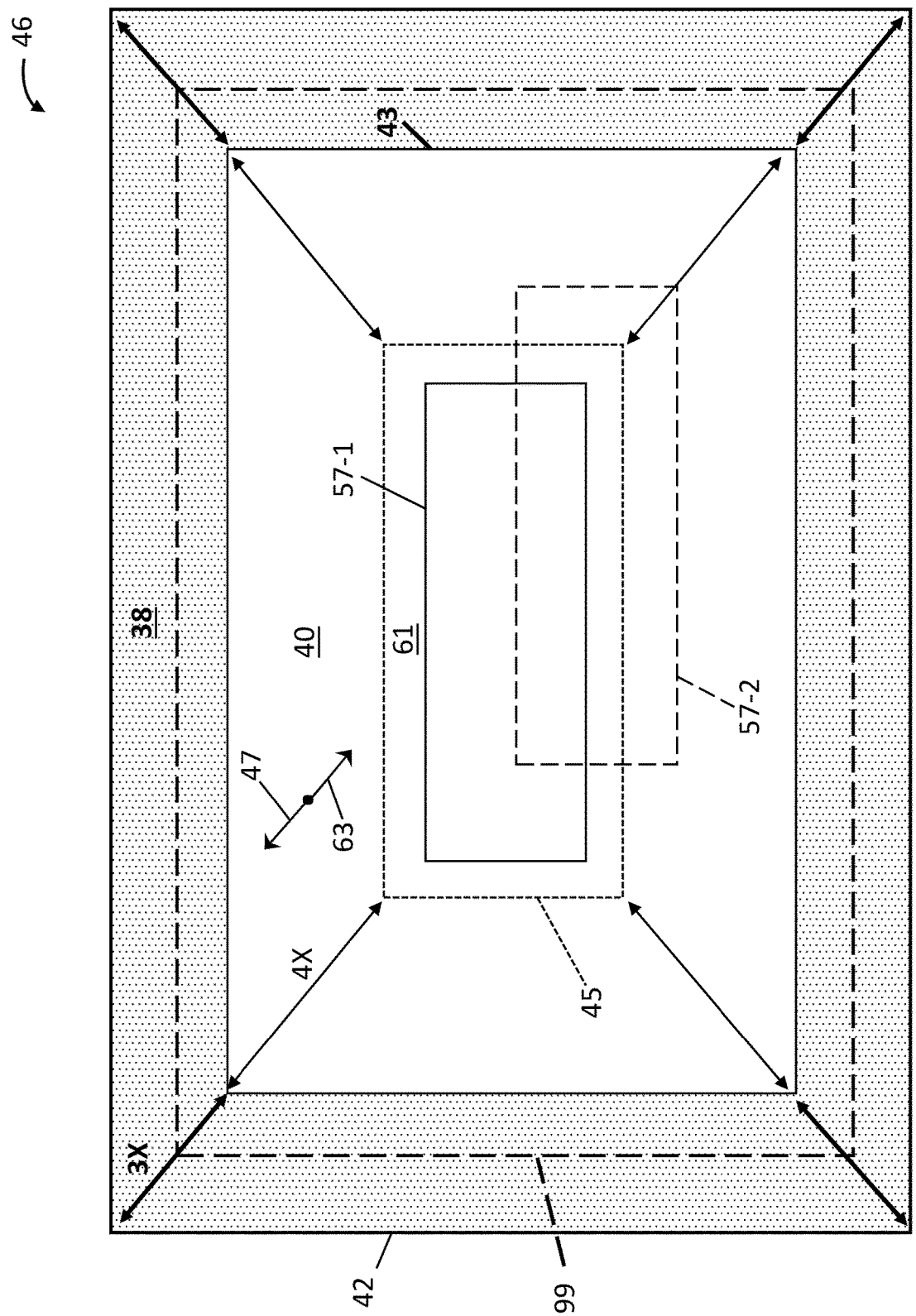

FIGS. 4A and 4B depict block diagrams of an EIS process 46 in accordance with some embodiments. FIG. 4A shows the hybrid zoom and EIS process 46 according to the present technology as applied in the case of a user-commanded zoom level for raw video stream input 7 being ≤3× (e.g., 2×). Camera sensor(s) 8 in the process 46 in FIG. 4A may capture raw video stream input 7 as window 42. Front end module 5 may scale frames of raw video input stream 7 based on the zoom level desired by the UAV user, e.g., 2×, thereby cropping window 42 to a window 41. With the cropping of window 42 to window 41, pixels 38 may be discarded or otherwise unavailable for use in later operations by EIS module 19. As the UAV 2 user-commanded zoom in the case of FIG. 4A is ≤3×, no further zooming is required by EIS module 19, and EIS may then be applied directly to window 41, with a margin 53 being applied to window 41. The EIS margin 53 may be 15%, thereby reducing (e.g., cropping) the size (e.g., area) of window 41 by 15%, thereby resulting in a stabilization viewport 49-1, as shown in FIG. 4A.

In process 46, EIS module 19 may use IMU 3 to compute a vector 47 representing an acceleration of camera sensor(s) 8 and compute an opposing vector 55 to counteract effects of vector 47. EIS module 19 may move window 49-1 from a first position to a second position represented by window 49-2 in FIG. 4A. These windows 49 may be referred to elsewhere herein as stabilization viewports 49. Such movement may be made in process 46 according to at least opposing vector 55, among other data, where the direction of the movement may be generally opposite that of vector 47 in an effort to stabilize (e.g., still) the image frame and thus also the video stream displayed to UAV user at, e.g., ground station 22.

In process 46 as shown in FIG. 4A, EIS module 19 may, depending on the extent (e.g., magnitude) of vector 47 (and thus also opposing vector 55) and a particular current position of window 49-1 inside the perimeter of window 41, attempt to move window 49-1 to the second positioned window 49-2 into the area of window 42, where pixels 38 may be discarded or otherwise not, at least immediately, available for use by EIS module 19 according to the present technology. As compared to the 16× zoom case of the known process 44 shown and described above with reference to FIG. 2, the amount of pixels 38 is relatively low as window 41 represents the 2× zoom cropping by front end 5. Although it may be a rare case during operation of system 1, EIS module 19 may run out of pixel data 38 where acceleration vector 47 does present this potentially problematic situation. To address such use cases, some embodiments of the present technology may utilize front end module 5 and memory 11 (or EIS module 19—dedicated memory) to retain at least a portion of pixels 38 for use by EIS module 19 as, for example, a secondary margin 98, whereby the EIS techniques and algorithms may still be effectively applied to window 49-1, for example, moved out of window 41 beyond margin 53.

FIG. 4B shows the hybrid zoom and EIS process 46 according to the present technology as applied in the case of a user-commanded zoom level for raw video stream input 7 being >3× (e.g., 3×*4×=12×). Camera sensor(s) 8 in the process 46 in FIG. 4B may capture raw video stream input 7 as window 42. Front end module 5 may scale frames of raw video input stream 7 based on the zoom level desired by the UAV user up to its clamped maximum zoom, e.g., 3×, thereby cropping window 42 to a window 43. With the cropping of window 42 to window 43, pixels 38 may be discarded or otherwise unavailable for use in later operations by EIS module 19. As the UAV 2 user-commanded zoom in the case of FIG. 4B is >3×, EIS module 19 further zooms window 43 by 4×, thereby providing the total user-commanded zoom of 12×. EIS may then be applied directly to window 45, with a margin 61 being applied to window 45. The EIS margin 61 may be 15%, thereby reducing (e.g., cropping) the size (e.g., area) of window 45 by 15%, thereby resulting in a stabilization viewport 57-1, as shown in FIG. 4B.

Notably, as compared to the known process 44 of FIG. 2, a significantly lower among of pixels 38 are discarded in process 46 shown in FIG. 4B, which, especially in cases where the user-commanded zoom level is >3×, enable improved EIS to be applied and enjoyed by UAV 2 users as compared to conventional systems and methods.

In process 46, EIS module 19 may use IMU 3 to compute vector 47 representing an acceleration of camera sensor(s) 8 and compute an opposing vector 63 to counteract effects of vector 47. EIS module 19 may move window 57-1 from a first position to a second position represented by window 57-2 in FIG. 4B. These windows 57 may be referred to elsewhere herein as stabilization viewports 57. Such movement may be made in process 46 according to at least opposing vector 63, among other data, where the direction of the movement may be generally opposite that of vector 47 in an effort to stabilize (e.g., still) the image frame and thus also the video stream displayed to UAV user at, e.g., ground station 22.

In process 46 as shown in FIG. 4B, EIS module 19 may, depending on the extent (e.g., magnitude) of vector 47 (and thus also opposing vector 63) and a particular current position of window 57-1 inside the perimeter of window 43, attempt to move window 57-1 to the second positioned window 57-2 into the area of window 42, where pixels 38 may be discarded or otherwise not, at least immediately, available for use by EIS module 19 according to the present technology. As compared to the 16× zoom case of the known process 44 shown and described above with reference to FIG. 2, the amount of pixels 38 is substantially lower as compared to such pixels in FIG. 2, given the clamping of front end module 5 zooming to the 3× maximum, as described above. Although it may be a rare case during operation of system 1, EIS module 19 may run out of pixel data 38 where acceleration vector 47 does present this potentially problematic situation. To address such use cases, some embodiments of the present technology may utilize front end module 5 and memory 11 (or EIS module 19—dedicated memory) to retain at least a portion of pixels 38 for use by EIS module 19 as, for example, a secondary margin 99, whereby the EIS techniques and algorithms may still be effectively applied to window 57-1, for example, moved out of window 43 beyond margin 53, and even beyond an area 40 of window 43.

Figure 5A:
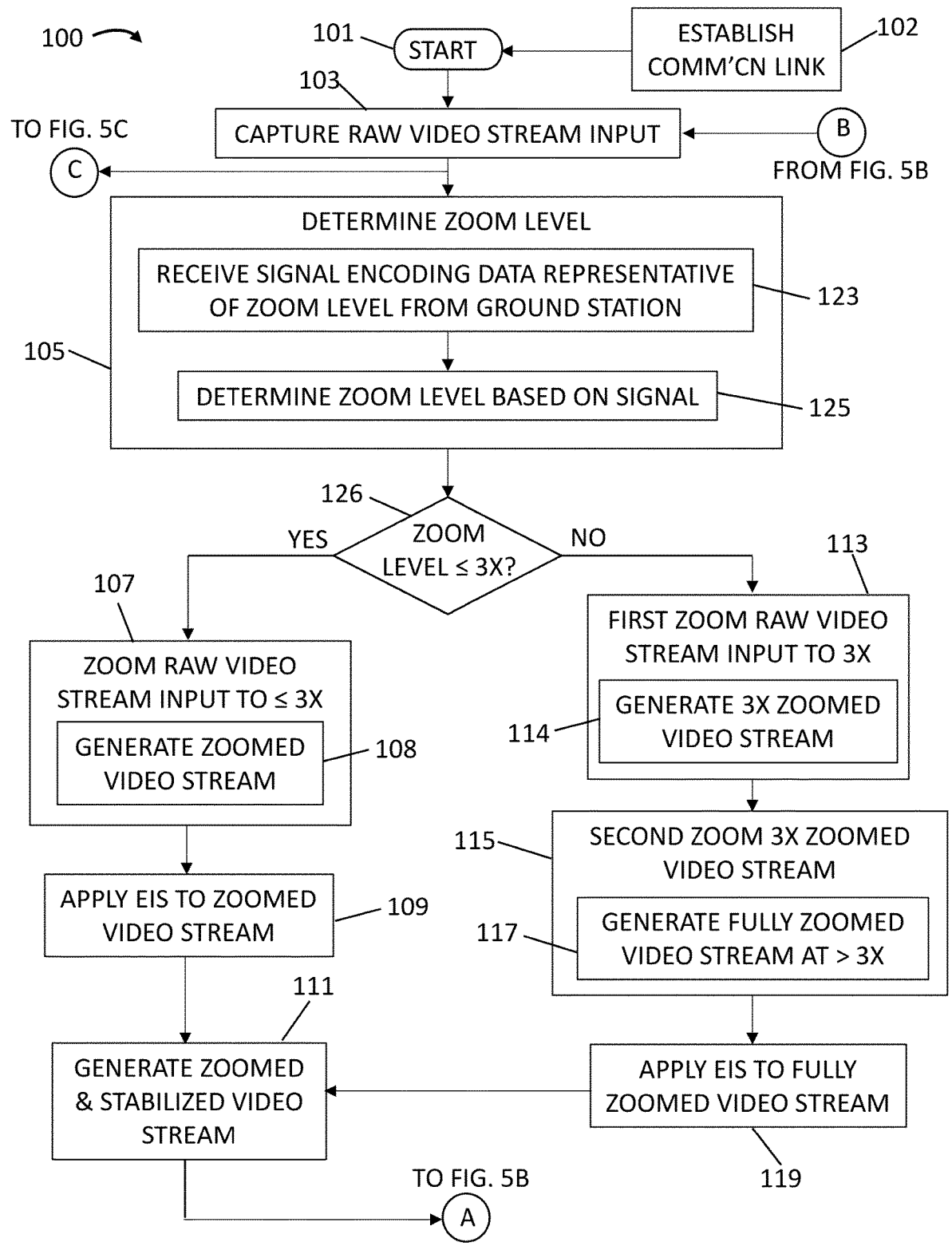
FIGS. 5A-5E depict flow charts of a method for operating the UAV system shown in FIGS. 1 and 2 in accordance with some embodiments.

FIGS. 5A-5E depict flow charts of a method 100 for operating the UAV system (e.g., system 1) shown in FIGS. 1 and 3 in accordance with some embodiments. Referring now to FIG. 5A, and with further reference back to FIGS. 1, 3, 4A and 4B, and their description above, method 100 may commence from a start state 101. In an example, start state 101 may correspond to the UAV 2 being powered on following a period of being powered off or being in a sleep or other low power consumption mode of operation. In another example, method 100 may include the step of establishing 102 (e.g., using WiFi) communications link 28 between UAV 2 and ground station 22, and start state 101 may additionally, or instead, correspond to communications link 28 being effectively established 102.

Method 100 may include the step of capturing 103 raw video stream input 7 using camera sensor(s) 8. Method 100 may also include the step of determining 105, e.g., by computing device(s) of UAV 2, a zoom level for the raw video stream input 7. In some embodiments, method 100 may include the step of receiving 123, e.g., using communications interface 18 and via communications link 28, the above described zoom control signal 50. In those embodiments, the determining 105 step of method 100 may include determining 125 the zoom level for the raw video stream input 7 according to the data representative of the zoom level encoded by the zoom control signal 50.

From the determining 105 step, method 100 may proceed to a logical branch 126 whereby it is identified, e.g., by UAV 2 computing device(s), whether or not the aforementioned zoom level if ≤3×. Depending on a result of this identifying operation in logical branch 126, method 100 may proceed in one of two paths, as described below.

In response to identifying, e.g., in logical branch 126, that the zoom level for the raw video stream input 7 is ≤3×, method 100 may include the step of zooming 107, e.g., by the front end module 5, the raw video stream input 7 to a field of view (FOV) 41 at a first zoom level that is ≤3×. In some embodiments, a result of the zooming 107 step in method 100 may be generating 108 a zoomed stream 9. In the case of the zoom level being identified in logical branch 126 to be ≤3×, method 100 may also include the step of applying 109, e.g., by EIS module 19 and its component parts as described above with reference to FIGS. 1 and 2, EIS techniques and related algorithms to the zoomed video stream 9. In some embodiments, a result of the applying 109 step in method 100 may be generating 111 a zoomed and stabilized video stream 25.

Alternatively, in response to identifying, e.g., in logical branch 126, that the zoom level for the raw video stream input 7 is >3×, method 100 may include the step of first zooming 113, e.g., by the front end module 5, the raw video stream input 7 to a first FOV 43 at a 3× zoom level. In some embodiments, a result of the first zooming 113 step in method 100 may be generating 114 a 3× zoomed stream 34. In the case of the zoom level being identified in logical branch 126 to be >3×, method 100 may also include the step of second zooming 115, e.g., by EIS module 19, the 3× zoomed video stream 34 to a second FOV 45 at a second zoom level. In an example, the second zoom level may be defined by a numerical value that, when multiplied by the 3× value applied by front end module 5 for the first zooming 113, provides the total user-commanded zoom level up to a maximum zoom level (e.g., 16×) that system 1 is capable of providing. In some embodiments, a result of the second zooming 115 step in method 100 may be generating 117 a fully zoomed video stream 37 at >3×. Also in the case of the zoom level being identified in logical branch 126 to be >3×, method 100 may further include the step of applying 119, e.g., by EIS module 19 and its component parts, EIS techniques and related algorithms to the fully zoomed video stream 37. In some embodiments, a result of the applying 119 step in method 100 may be generating 111 the zoomed and stabilized video stream 25.

Figure 5B:
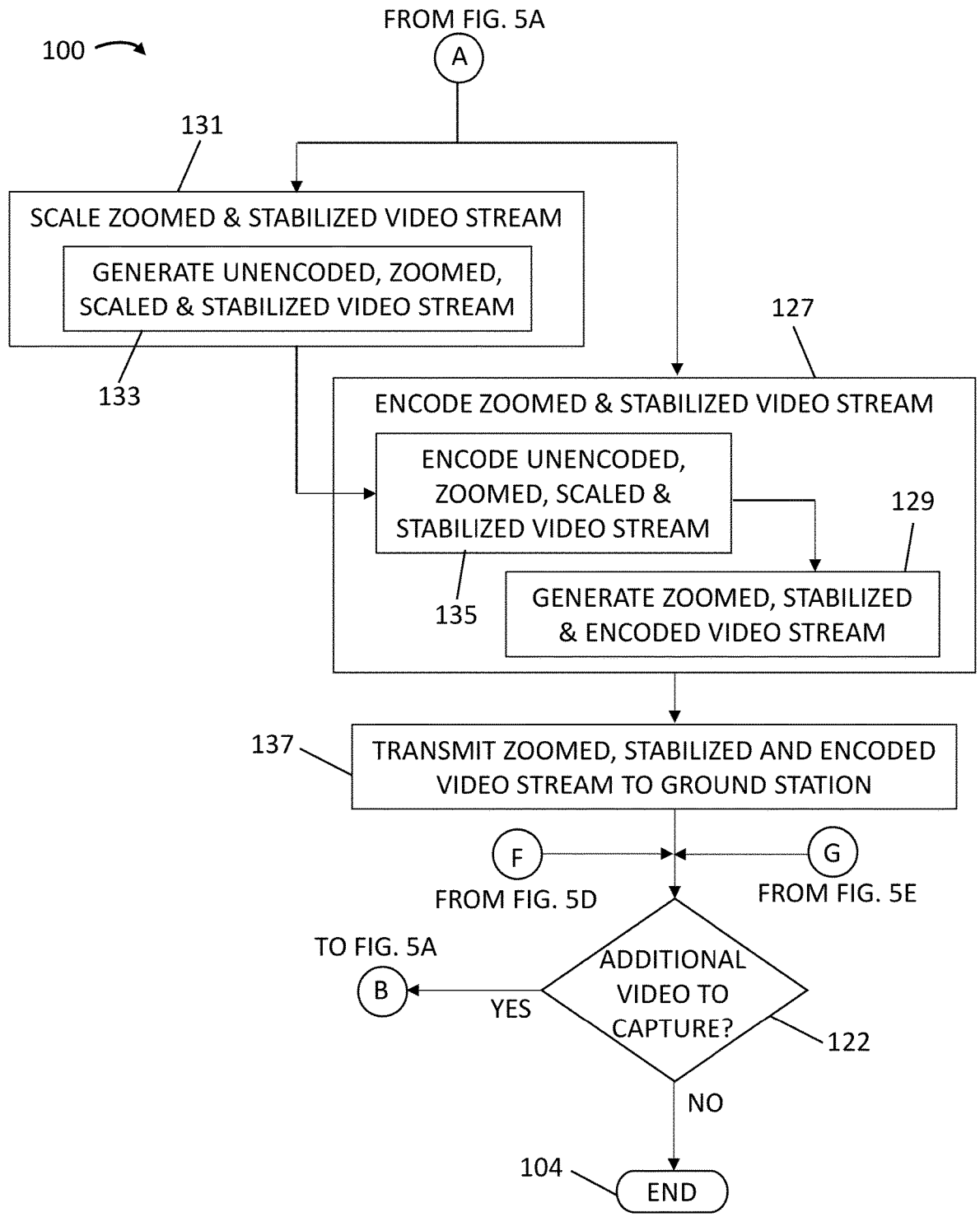

Following performance of the generating 111, method 100 may proceed to additional process steps to facilitate beneficial use of the data encoded by the zoomed and stabilized video stream 25 by the AP module 12 and the UAV 2 user, e.g., at ground station 22. Referring now to FIG. 5B, and transitioning thereto from FIG. 5A from the circled letter "A," in some embodiments, method 100 may include the step of encoding 127, e.g., using encoder 14, the zoomed and stabilized video stream 25. For example, and without limitation, an unencoded YUV format zoomed and stabilized video stream 25 may be encoded 127 to an H.264 video stream. In some embodiments, a result of the encoding 127 step in method 100 may be generating 129 a zoomed, stabilized and encoded video stream 32.

In an example embodiment, method 100 may also include the step of scaling 131, e.g., using scaler 15, the zoomed and stabilized video stream 25. A result of the scaling 131 step in method 100 may be generating 133 an unencoded, zoomed, scaled and stabilized video stream 29. In the example embodiment, the encoding 127 step of method 100 may include encoding 135 the unencoded, zoomed, scaled and stabilized video stream 29 to thereby generate 129 the zoomed, stabilized and encoded video stream 32.

Referring still to FIG. 5B, from the encoding 127 step, method 100 may proceed to the step of transmitting 137, e.g., using communications interface 18 and via communications link 28, the zoomed, stabilized and encoded video stream 32 to ground station 22 for viewing on its display 30. After, or concurrently with, performance of either the transmitting 137 step in method 100, the process may proceed to a logical branch 122, whereby communications interface 18 and/or computing device(s) of UAV 2 system 1 may identify whether or not there is additional video to be captured (e.g., by camera sensor(s) 8) and processed according to the present technology. This identification in method 100 may include determining if additional video stream data is incoming to front end module 5, ISP module 10, and/or AP module 12.

Where additional video to be captured is not identified at logical branch 122, method 100 may proceed to an end state 104. In an example, where there is no additional video to be captured in method 100, electronics 4 or part of the above described components thereof, may enter a powered off or low power (e.g., sleep) mode for the end state 104. In another example, method 100 may proceed to the end state 104 by the action of a user of UAV 2, as in turning its power off. Alternatively, where additional video to be captured is identified at logical branch 122, method 100 may proceed to iterate through the process described above with reference to the foregoing figures, transitioning from FIG. 5B back to FIG. 5A via the circled letter "B."

Figure 5C:
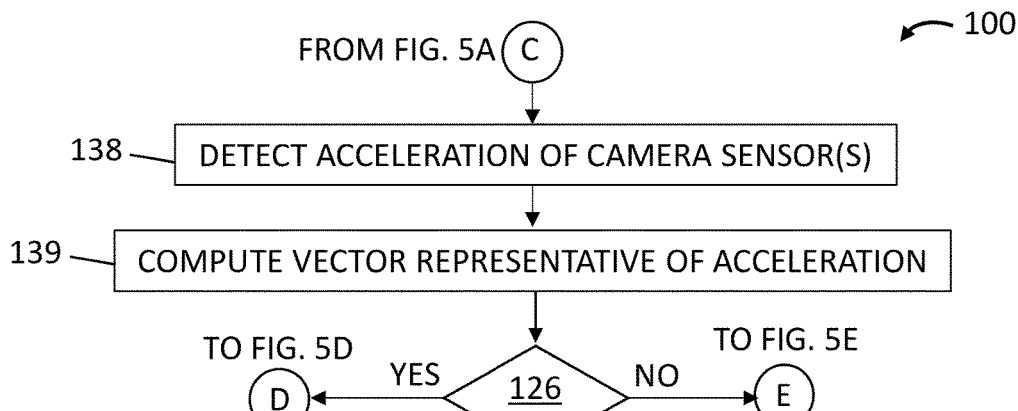

Referring now to FIG. 5C, and transitioning thereto from FIG. 5A via the circled letter "C," method 100 may include the steps of: detecting 138, e.g., using IMU 3, an acceleration of the one or more camera sensor(s) 8; and computing 139, e.g., using EIS module 19 and its component parts, a vector 47 representative of the acceleration of the one or more camera sensor(s) 8. In some embodiments, method 100 may perform additional process steps after, or concurrently, or iteratively, with performance of the detecting 138 and/or computing 138 steps depending on whether or not logical branch 126 identifies that the zoom level for the raw video stream input 7 is >3×.

Figure 5D:
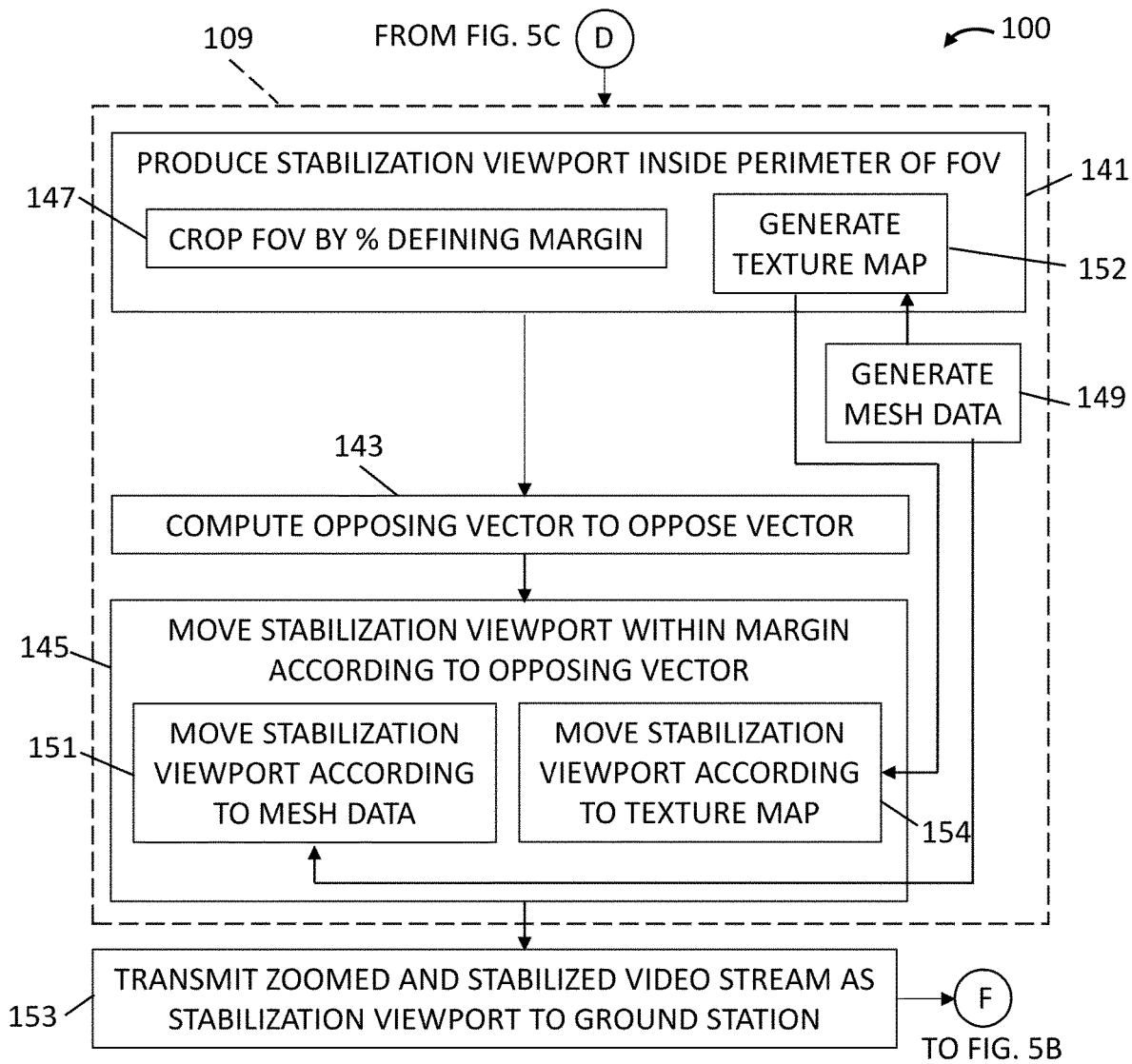

Referring now to FIG. 5D, and transitioning thereto from FIG. 5C via the circled letter "D," for the zoom level for raw video input stream 7 being identified, e.g., in logical branch 126, to be ≤3×, the above described step of applying 109 EIS to the zoomed video stream 9 in method 100 may include producing 141, e.g., by EIS module 19 and its component parts, a stabilization viewport 49 inside a perimeter of the FOV 41, where the stabilization viewport 49 and the perimeter of FOV 41 may be separated by a margin 53 (e.g., 15%). In an example, the producing 141 step of method 100 may include the step of cropping 147 FOV 41 by a predetermined percentage (e.g., 15%) defining the margin 53, where the predetermined percentage value may be stored in memory 11 as a parameter for use by EIS module 19 according to the present technology. Further in response to the zoom level being determined 105 to be ≤3×, method 100 may further include the steps of: computing 143, e.g., by EIS module 19, an opposing vector 55 counteracting the vector 47; and causing, e.g., by EIS module 19, stabilization viewport 49 to be moved 145 within margin 53 based, at least in part, on the opposing vector 55 to thereby generate 111 zoomed and stabilized video stream 25.

In further response to the zoom level for raw video input stream 7 being identified, e.g., in logical branch 126, to be ≤3×, method 100 include the step of generating 149, e.g., by EIS module 19 and its component parts as described above with reference to FIGS. 1 and 3, mesh data 35. Among other potential contents having useful purposes in method 100 according to the present technology, mesh data 35 may define coordinates of the stabilization viewport 49 within the FOV 41 according to vector 47 (or opposing vector 55). Mesh data 35 may, in some examples, further define the aforementioned coordinates of stabilization viewport 49 according to at least one property of lens 36. In some embodiments, the method 100 step of moving 145 the stabilization viewport 49 may include moving 151 the stabilization viewport 49 further according to the mesh data 35.

Still referring to FIG. 5D, further in response to the raw video input stream 7 zoom level being determined 105 to be ≤3×, method 100 may include the step of generating 152, e.g., by EIS module 19 and its component parts as described above with reference to FIGS. 1 and 3, a texture map for the stabilization viewport 49 according to at least the mesh data 35. In embodiments of method 100 including the generating 152 step, the above described step of moving 145 stabilization viewport 49 may include moving 154 stabilization viewport 49 further according to data representative of the texture map. Following performance of the moving 145 step, method 100 may proceed to the step of transmitting 153 the zoomed and stabilized video stream 25 as the stabilization viewport 49 to ground station 22 for viewing on its display 30. In an example, the transmitting 153 may be included in the above described transmitting 137 step of method 100, as denoted in the figures by the circled letter "F" in FIG. 5D for the transition back to the transmitting 137 step shown in FIG. 5B.

Figure 5E:
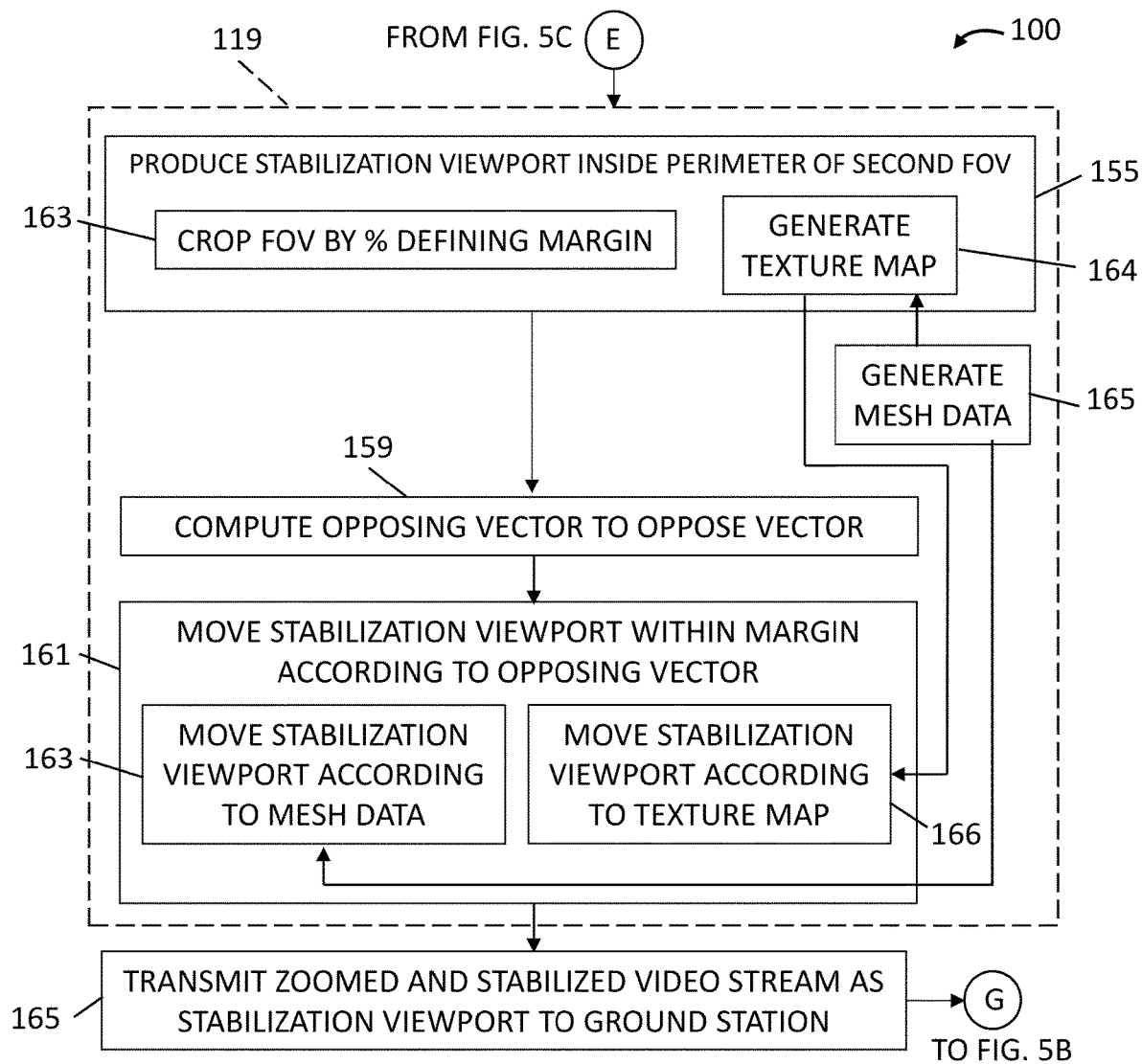

Referring now to FIG. 5E, and transitioning thereto from FIG. 5C via the circled letter "E," for the zoom level for raw video input stream 7 being identified, e.g., in logical branch 126, to be >3×, the above described step of applying 119 EIS to the fully zoomed video stream 37 in method 100 may include producing 155, e.g., by EIS module 19 and its component parts, a stabilization viewport 57 inside a perimeter of the second FOV 45, where the stabilization viewport 57 and the perimeter of second FOV 45 may be separated by a margin 61 (e.g., 15%). In an example, the producing 155 step of method 100 may include the step of cropping 163 second FOV 45 by a predetermined percentage (e.g., 15%) defining the margin 61, where the predetermined percentage value may be stored in memory 11 as a parameter for use by EIS module 19 according to the present technology. Further in response to the zoom level being determined 105 to be >3×, method 100 may further include the steps of: computing 159, e.g., by EIS module 19, an opposing vector 63 counteracting the vector 47; and causing, e.g., by EIS module 19, stabilization viewport 57 to be moved 161 within margin 61 based, at least in part, on the opposing vector 63 to thereby generate 111 zoomed and stabilized video stream 25.

In further response to the zoom level for raw video input stream 7 being identified, e.g., in logical branch 126, to be >3×, method 100 include the step of generating 165, e.g., by EIS module 19 and its component parts as described above with reference to FIGS. 1 and 3, mesh data 35. Among other potential contents having useful purposes in method 100 according to the present technology, mesh data 35 may define coordinates of the stabilization viewport 57 within the second FOV 45 according to vector 47 (or opposing vector 63). Mesh data 35 may, in some examples, further define the aforementioned coordinates of stabilization viewport 57 according to at least one property of lens 36. In some embodiments, the method 100 step of moving 161 the stabilization viewport 57 may include moving 163 the stabilization viewport 57 further according to the mesh data 35.

Still referring to FIG. 5E, further in response to the raw video input stream 7 zoom level being determined 105 to be >3×, method 100 may include the step of generating 164, e.g., by EIS module 19 and its component parts as described above with reference to FIGS. 1 and 3, a texture map for the stabilization viewport 57 according to at least the mesh data 35. In embodiments of method 100 including the generating 164 step, the above described step of moving 161 stabilization viewport 57 may include moving 166 stabilization viewport 57 further according to data representative of the texture map. Following performance of the moving 161 step, method 100 may proceed to the step of transmitting 165 the zoomed and stabilized video stream 25 as the stabilization viewport 57 to ground station 22 for viewing on its display 30. In an example, the transmitting 165 may be included in the above described transmitting 137 step of method 100, as denoted in the figures by the circled letter "G" in FIG. 5E for the transition back to the transmitting 137 step shown in FIG. 5B.

Figure 6:
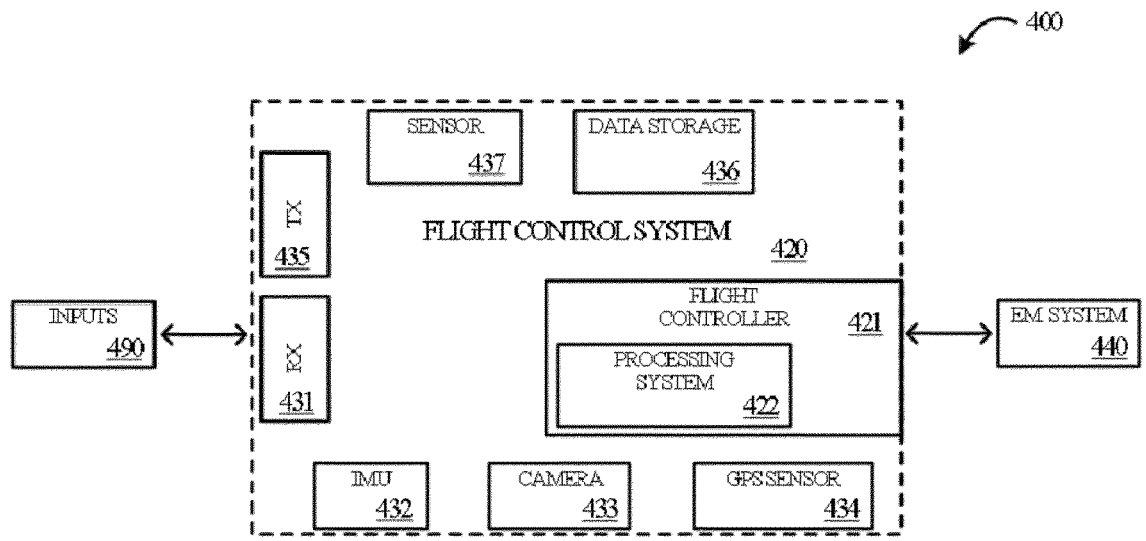
FIG. 6 depicts a systems architecture of a UAV in an implementation.

FIG. 6 depicts a systems architecture 400 of a UAV, such as UAV 2, in an implementation. Systems architecture 400 includes flight control system 420, electromechanical system 440, and operational inputs 490. Flight control system 420 comprises one or more receivers RX 431 for receiving operational inputs 490, such as wireless network communication or flight commands from a remote control device (e.g., ground station 22). Flight control system 420 further comprises flight controller 421, inertial measurement unit (IMU) 432, camera 433, GPS sensor 434, transmitter TX 435, and data storage 436. Data storage 436 includes persistent or nonvolatile memory or a removable memory card (e.g., an SD card) for recording flight and sensor data gathered from onboard devices, including photos or video captured by onboard cameras, or for storing programmed flight programs for use by the UAV. Flight control system 420 may also comprise one or more other sensors 437 such as barometers, altimeters, additional cameras, heat-detecting sensors, electromagnetic sensors (e.g., infrared or ultraviolet), compasses, anemometers or wind sensors, magnetometers, and so on. Onboard camera 433 comprises a device for capturing imaging data, such as video or still photography, across visible and other wavelengths of the electromagnetic spectrum, such as ultraviolet or infrared wavelengths.

Electromechanical system 440 provides the propulsion for the UAV, typically comprising an electronic speed controller which throttles one or more rotors according to flight instructions received from flight control system 420. It may be appreciated that both flight control system 420 and electromechanical system 440 can include other elements in addition to (or in place of) those disclosed herein, which are illustrated for exemplary purposes.

Figure 7:
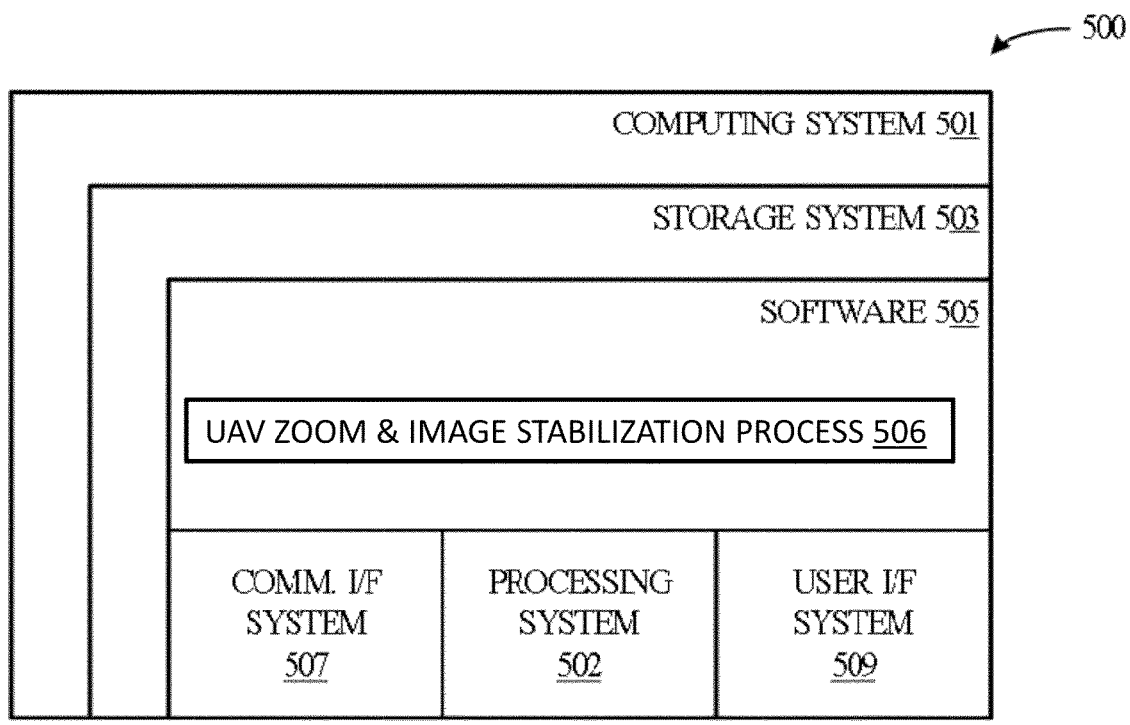
FIG. 7 depicts a block diagram of a computing system suitable for implementing the various operational environments, architectures, processes, scenarios, and sequences discussed below with respect to the other figures.

FIG. 7 depicts a block diagram of a computing system 500 suitable for implementing the various operational environments, architectures, processes, scenarios, and sequences discussed below with respect to the other figures. Computing system 500 may include a computing device 501 that is representative of any system or collection of systems in which the various processes, programs, services, and scenarios disclosed herein may be implemented. Examples of computing device 501 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes and implements zoom and image stabilization process 506, which is representative of the UAV-related processes described above according to the present technology with respect to the preceding figures, such as method 100. When executed by processing system 502, software 505 directs processing system 502 to operate as described herein for at least the various processes, operational scenarios, and sequences discussed in the foregoing implementations. Computing device 501 may optionally include additional devices, features, or functionality not discussed for purposes of brevity.

Referring still to FIG. 7, processing system 502 may comprise a microprocessor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including UAV zoom and image stabilization process 506) may be implemented in program instructions and among other functions may, when executed by processing system 502, direct processing system 502 to operate as described with respect to the various operational scenarios, sequences, and processes illustrated herein. For example, software 505 may include program instructions for implementing the UAV task planning processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to support sensor device deployments and swaps. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary, etc.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (e.g., ground station 22), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology may be presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an unmanned aerial vehicle (UAV), the method comprising:
    capturing a raw video stream input using one or more camera sensors of the UAV;
    determining a zoom level for the raw video stream input; and
    responsive to determining the zoom level being less than or equal to 3×,
        zooming the raw video stream input to a field of view at a first zoom level of less than or equal to 3× to generate a zoomed video stream; and
        applying electronic image stabilization to the zoomed video stream to generate a zoomed and stabilized video stream; and
    responsive to determining the zoom level being greater than 3×,
        first zooming the raw video stream input to a first field of view at 3× to generate a 3× zoomed video stream;
        second zooming the 3× zoomed video stream to a second field of view at a second zoom level to generate a fully zoomed video stream at greater than 3×; and
        applying electronic image stabilization to the fully zoomed video stream to generate a zoomed and stabilized video stream.

2. The method of claim 1 further comprising establishing a communications link between the UAV and a ground station.

3. The method of claim 2 further comprising receiving, by the UAV via the communications link, a signal encoding data representative of the zoom level from the ground station.

4. The method of claim 3, wherein determining the zoom level for the raw video stream input comprises determining the zoom level according to the data representative of the zoom level.

5. The method of claim 1 further comprising encoding the zoomed and stabilized video stream to generate a zoomed, stabilized and encoded video stream.

6. The method of claim 5 further comprising scaling the zoomed and stabilized video stream to generate an unencoded, zoomed, scaled and stabilized video stream.

7. The method of claim 6, wherein encoding the zoomed and stabilized video stream comprises encoding the unencoded, zoomed, scaled and stabilized video stream.

8. The method of claim 5 further comprising transmitting the zoomed, stabilized and encoded video stream to a ground station communicably coupled to the UAV via a communications link.

9. The method of claim 1 further comprising:
    detecting an acceleration of the one or more camera sensors; and
    computing a vector representative of the acceleration of the one or more camera sensors.

10. The method of claim 9, wherein applying electronic image stabilization to the zoomed video stream comprises:
    producing a stabilization viewport inside a perimeter of the field of view, wherein the stabilization viewport and the perimeter of the field of view are separated by a margin;
    computing an opposing vector counteracting the vector; and
    moving the stabilization viewport within the margin according to the opposing vector to generate the zoomed and stabilized video stream.

11. The method of claim 10, wherein producing the stabilization viewport comprises cropping the field of view by a predetermined percentage defining the margin.

12. The method of claim 10 further comprising generating mesh data defining coordinates of the stabilization viewport within the field of view according to the vector and at least one property of a lens of the one or more camera sensors, wherein moving the stabilization viewport comprises moving the stabilization viewport further according to the mesh data.

13. The method of claim 12, wherein producing the stabilization viewport comprises generating a texture map for the stabilization viewport according to the mesh data, and wherein moving the stabilization viewport comprises moving the stabilization viewport further according to the texture map.

14. The method of claim 10 further comprising transmitting the zoomed and stabilized video stream as the stabilization viewport to a ground station communicably coupled to the UAV via a communications link.

15. The method of claim 9, wherein applying electronic image stabilization to the fully zoomed video stream comprises:
    producing a stabilization viewport inside a perimeter of the second field of view, wherein the stabilization viewport and the perimeter of the second field of view are separated by a margin;
    computing an opposing vector counteracting the vector; and
    moving the stabilization viewport within the margin according to the opposing vector to generate the zoomed and stabilized video stream.

16. The method of claim 15, wherein producing the stabilization viewport comprises cropping the second field of view by a predetermined percentage defining the margin.

17. The method of claim 15 further comprising generating mesh data defining coordinates of the stabilization viewport within the second field of view according to the vector and at least one property of a lens of the one or more camera sensors, wherein moving the stabilization viewport comprises moving the stabilization viewport further according to the mesh data.

18. The method of claim 17, wherein producing the stabilization viewport comprises generating a texture map for the stabilization viewport according to the mesh data, and wherein moving the stabilization viewport comprises moving the stabilization viewport further according to the texture map.

19. The method of claim 15 further comprising transmitting the zoomed and stabilized video stream as the stabilization viewport to a ground station communicably coupled to the UAV via a communications link.

20. A system for operating an unmanned aerial vehicle (UAV), the system comprising:
    one or more camera sensors for capturing a raw video stream input; and
    at least one computing device disposed onboard the UAV and operably coupled to the one or more camera sensors, the at least one computing device configured to:
    determine a zoom level for the raw video stream input;
    responsive to determining the zoom level being less than or equal to 3×,
        zoom the raw video stream input to a field of view at a first zoom level of less than or equal to 3× to generate a zoomed video stream; and
        apply electronic image stabilization to the zoomed video stream to generate a zoomed and stabilized video stream; and
    responsive to determining the zoom level being greater than 3×,
        first zoom the raw video stream input to a first field of view at 3× to generate a 3× zoomed video stream;
        second zoom the 3× zoomed video stream to a second field of view at a second zoom level to generate a fully zoomed video stream at greater than 3×; and
        apply electronic image stabilization to the fully zoomed video stream to generate a zoomed and stabilized video stream.

21. One or more non-transitory computer readable media having stored thereon program instructions which, when executed by at least one processor, cause an unmanned aerial vehicle (UAV) to:
    determine a zoom level for a raw video stream input captured by one or more camera sensors of the UAV;
    responsive to determining the zoom level being less than or equal to 3×,
        zoom the raw video stream input to a field of view at a first zoom level of less than or equal to 3× to generate a zoomed video stream; and
        apply electronic image stabilization to the zoomed video stream to generate a zoomed and stabilized video stream; and
    responsive to determining the zoom level being greater than 3×,
        first zoom the raw video stream input to a first field of view at 3× to generate a 3× zoomed video stream;
        second zoom the 3× zoomed video stream to a second field of view at a second zoom level to generate a fully zoomed video stream at greater than 3×; and
        apply electronic image stabilization to the fully zoomed video stream to generate a zoomed and stabilized video stream.

* * * * *